United States Patent Office

2,769,840
Patented Nov. 6, 1956

2,769,840

COMPLEXES OF HIGHER ALKANOL AMINES AND BORON TRIFLUORIDE

Frank J. Sowa, Cranford, N. J.

No Drawing. Application December 29, 1951,
Serial No. 264,279

18 Claims. (Cl. 260—584)

This application is a continuation-in-part of my co-pending application Serial No. 111,590 filed August 20, 1949, now abandoned.

This invention relates to a new class of chemical compounds consisting of coordination complexes of boron trifluoride and those alkanol amines which contain an alkyl or alkenyl group having from 10 to 18 carbon atoms in a straight chain with a terminal carbon atom of the chain connected to the nitrogen atom of the amine.

It is found that boron halides, such as boron trichloride and boron tri-iodide, react with alkanol amines to form the corresponding alkyl amine esters of boron with the splitting off of hydrogen chloride or hydrogen iodide and resulting side reaction according to the equations $$BCl_3 + 3H_2NROH \rightarrow (H_2NRO)_3B + 3HCl$$

$$HCl + H_2NROH \rightarrow NH_3ClROH$$

I have discovered that boron trifluoride is unique in that when it is reacted with alkanol amines containing at least two carbon atoms in the alkanol group an entirely different type of reaction takes place as indicated by the typical equation $$BF_3 + H_2NROH \rightarrow H_2NROH \cdot BF_3$$

The products resulting from such reactions are boron fluoride-alkanol amine complexes having the general formula

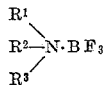

wherein $R^1$ is an alkanol radical and $R^2$ and $R^3$ may be hydrogen, hydrocarbon radicals or alkanol radicals.

While the alkanol amines which include lower alkyl groups such as mono and diethanol amine and isopropanol amine have been produced and suggested for use as a soldering flux, I have found that those complexes of boron trifluoride and the higher alkanol amines, namely those which include an alkyl or alkenyl group having a straight chain containing 10 or more carbon atoms attached to the nitrogen atom of the amine by a terminal carbon atom, have other characteristics which are not possessed by those of the complexes containing only lower alkyl groups.

The compounds of the present invention therefore represent a new class of chemical products having characteristic properties and important new uses. For instance, they are all useful as wetting agents and bactericides. They also are more effective as herbicides than are the lower alkyl amines. They further are useful as rodent repellents, insecticides, fungicides, larvicides, as catalysts for organic reactions as leveling agents in paints and for numerous other purposes.

The object of the present invention is to provide a new class of chemical compounds consisting of coordination complexes of boron trifluoride and those alkanol amines which contain an alkyl or alkenyl group having 10 to 18 carbon atoms in a straight chain connected to the nitrogen atom of the amine by a terminal carbon atom of the chain.

Another object of the invention is to provide complexes of boron trifluoride and alkanol amines which have characteristic bactericidal and bacteristatic properties.

These and other objects and features of the present invention will appear in the following description thereof in which typical compounds and methods of producing the same are cited for the purpose of indicating the nature of the present invention but without intending to limit the scope of the invention thereby.

The products of the present invention have the composition indicated by the general formula

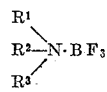

wherein $R^1$ is an alkanol group, $R^2$ is an alkyl or alkenyl group containing 10 to 18 carbon atoms in a straight chain with a terminal carbon atom of the chain attached to the nitrogen and $R^3$ is hydrogen, an alkanol radical or an alkyl radical.

A sufficient number of compounds of this class have been produced by reactions between boron trifluoride and the higher alkanol amines to indicate that the reaction is general in character and applicable to all alkanol amines including an alkyl or alkenyl group containing 10 to 18 carbon atoms in the chain. The amines employed may be secondary or tertiary amines.

The alkanol radical preferably contains at least two carbon atoms since methylol groups have a tendency to cause polymerization to take place particularly when the reaction mixture or composition is heated. Typical of the preferred alkanol radicals are the ethanol, isopropanol, butanol and pentanol radicals as well as the polyethylene glycol polymers having a terminal OH group such as radicals represented by the formula $$-(CH_2CH_2O)_n CH_2CH_2OH$$

wherein $n$ is a whole number in excess of 1. Among the alkyl and alkenyl radicals attached to the nitrogen of the amine may be decyl, lauryl, cetyl, myristyl, stearyl, oleyl, undecenyl and branched chain radicals containing at least 10 carbon atoms in the straight chain such as -t-$C_{12}H_{25}$ and -t-$C_{18}H_{37}$. The third substituent attached to the nitrogen may be hydrogen, one of the alkanol radicals previously mentioned or a hydrocarbon radical such as methyl, ethyl, propyl, butyl, amyl and allyl radicals for example.

It is also found that boron trifluoride forms three different series of coordination complexes with alkanol amines wherein the ratio of the amine to the boron trifluoride is 1 to 1, 2 to 1 or 3 to 1. The reactions by which such complexes are produced may be represented by the following general equations:

$$R_3N + BF_3 \rightarrow R_3N \cdot BF_3$$

$$R_3N + R_3N \cdot BF_3 \rightarrow (R_3N)_2 \cdot BF_3$$

$$R_3N + (R_3N)_2 \cdot BF_3 \rightarrow (R_3N)_3 \cdot BF_3$$

where at least one R is an alkanol group and another R is a long chain alkyl group, the remaining R being hydrogen, or an alkanol or hydrocarbon radical.

Those coordination complexes in which the ratio of the amine to the boron trifluoride is 1 to 1 do not appear to ionize, whereas those complexes having the ratio of 2 to 1 and 3 to 1 apparently ionize according to the following equation:

$$[(R_3N)_n BF_{(4-n)}]^+ \cdot [(n-1)F]$$

where $n$ is 1 to 3.

While a large number of complexes of alkanol amines and boron trifluoride have been made and tested, it is found that those in which the alkanol group contain alkyl radicals having less than 10 carbon atoms in a straight chain do not exhibit any appreciable bactericidal or fungicidal activity. Those compounds having a decyl group, that is an alkyl radical containing 10 carbon atoms in a straight chain, possess bacteristatic and fungistatic properties and as the length of the alkyl chain increases the bactericidal and fungicidal activity is increased. The myristyl compounds which contain 14 carbon atoms in the alkyl group are outstanding in this respect and as the alkyl chain is increased in length the activity is generally reduced although the stearyl compounds possess effective bactericidal and bacteristatic as well as fungicidal and fungistatic properties.

In conducting tests on the alkanol amine·$BF_3$ compounds the methods employed were those described in the U. S. Department of Agriculture Circular No. 198. No bactericidal or fungicidal activity and no bacteristatic or fungistatic effects were obtained at concentrations of 1 part to 1,000 parts of water when using complexes of boron trifluoride with diethanol amine, diethyl amino ethanol, monoisopropanol amine, 2 (dihydroxy ethyl) heptyl amine and octyl amine in either the 1 to 1, 2 to 1 or 3 to 1 ratios of the amine to $BF_3$.

On the other hand significant and generally important bactericidal and fungicidal action was exhibited by the compounds containing an alkyl group having from 10 to 18 carbon atoms in a straight chain as indicated in the following table. The numbers in the table represent thousands of parts of water to one part of the complex used with effective results. Where concentrations greater than 1 part to 1,000 are required, the compound is considered inactive. The terms "cidal" and "static" appearing in the following table refer to fungicidal and fungistatic, respectively.

such as benzene and Stoddard solvent than are the lower alkanol amine complexes. The complexes containing 3 mols of amine to 1 mol of boron trifluoride are more soluble in hydrocarbon solvents than are those having the amine and boron trifluoride in the 1 to 1 ratio.

Typical compounds of the class to which this invention relates are the boron trifluoride complexes of secondary amines such as decyl ethanolamine, lauryl ethanolamine, lauryl isopropanolamine, cetyl ethanolamine, myristyl ethanolamine, myristyl isopropanolamine and stearyl ethanolamine. Typical complexes of tertiary amines are lauryl diethanolamine, myristyl diethanolamine, cetyl diethanolamine, stearyl diethanolamine, octadecadienyl diethanolamine, undecenyl diethanolamine, myristyl di-isopropanol amine, lauryl di-isopropanol amine and lauryl dibutanol amine. Each of these and other similar complexes may be produced as compounds in which the ratio of the amine to $BF_3$ is 1 to 1, 2 to 1 or 3 to 1. Moreover, mixtures of amines may be used or they may be reacted successively in producing complexes containing the amines in the ratio of 2 to 1 or 3 to 1. Thus, for example, a lauryl diethanolamine, myristyl diethanolamine, cetyl diethanolamine·$BF_3$ compound can be produced from the amines derived from a coconut oil base. Other mixed alkanol amine complexes can be produced if desired.

The reaction by which the products of the present invention are produced takes place readily upon contact of boron trifluoride with the alkanol amine. It is generally exothermic. The boron trifluoride may be brought into contact with the amine in the form of a gas or in the form of the ether complex of boron trifluoride or in any other suitable or preferred manner. The following are examples of typical reactions by which the products of the present invention may be produced.

*Example I*

1850 grams (10 mols) of lauryl amine were dissolved

| Amine $BF_3$ Complexes | Ratio | S. Aureus | | B. Typhosis | | T. Interdigitale | | T. Rubrum | |
|---|---|---|---|---|---|---|---|---|---|
| | | Cidal | Static | Cidal | Static | Cidal | Static | Cidal | Static |
| decyl 3 hydroxy butyl amine | 1 to 1 | | 5 | | 5 | | 5 | | 5 |
| 2 hydroxy ethyl undecenyl amine | 1 to 1 | | 1 | 1 | 5 | | 1 | | 1 |
| lauryl diethanol amine | 1 to 1 | | 20 | 1 | 5 | | 10 | 1 | 5 |
| | 2 to 1 | 1 | 20 | 1 | 5 | | 10 | | 5 |
| | 3 to 1 | 1 | 10 | | 10 | 1 | 10 | 1 | 5 |
| tridecyl ethanol amine | 2 to 1 | | 40 | 5 | 20 | | 20 | | 1 |
| myristyl diethanol | 1 to 1 | | 80 | 1 | 10 | | 40 | 1 | 20 |
| | 2 to 1 | 1 | 80 | 1 | 20 | 5 | 40 | 1 | 20 |
| | 3 to 1 | 1 | 80 | 5 | 20 | 1 | 40 | 5 | 20 |
| myristyl di isopropanol amine | 1 to 1 | | 40 | | 1 | | 1 | 1 | 1 |
| | 2 to 1 | | 40 | | 1 | | 20 | 1 | 1 |
| cetyl diethanol amine | 1 to 1 | | 1 | | | 1 | 10 | | 1 |
| | 2 to 1 | | 40 | | | 1 | 10 | 1 | 1 |
| | 3 to 1 | | 40 | | | | 5 | 1 | 10 |
| stearyl diethanol amine | 1 to 1 | | 20 | | | | 1 | 1 | 1 |
| | 2 to 1 | | 20 | | | | 1 | | 1 |
| | 3 to 1 | | 10 | | | | 10 | | 1 |

In addition it was found that the higher alkyl alkanol amine·$BF_3$ complexes were in many cases effective against the tubercle bacilli. In particular the myristyl compounds showed great promise in "in vitro" tests at concentrations as low as 1 part in 500,000 parts of water.

The coordination complexes of boron trifluoride and the higher alkanol amines comprised in the class to which this invention relates have other general characteristics which may be summarized in part as follows:

Most of the compounds are viscous liquids or waxy solids, although those containing the higher proportion of amine to boron fluoride are generally softer or more fluid than the compounds in which the amine and boron trifluoride are present in the ratio of 1 to 1. The solubility in water of those compounds containing 10 to 18 carbon atoms in the alkyl or alkenyl group is generally less than that of known compounds containing lower alkyl groups and usually is no more than about 10 grams per 100 cc. of water at room temperature. However, they are generally more soluble in hydrocarbon solvents in 1024 grams (20 mols) of isopropanol and placed in a flask having a reflux condenser and a stirrer. Gaseous ethylene oxide was introduced rapidly into the solution through an inlet tube kept below the surface of the liquid and the reaction mixture was cooled on a water bath to keep the temperature below 60° C. In about 12 hours 882 grams of ethylene oxide had reacted to provide a solution containing 2732 grams (10 mols) of lauryl diethanolamine in solution in 1024 grams of isopropyl alcohol. Gaseous boron trifluoride was then bubbled into the solution and 339 grams (5 mols) of boron trifluoride were absorbed in about three hours. The resulting product was an isopropyl alcohol solution containing the lauryl diethanolamine·$BF_3$ complex in which the ratio of the amine to $BF_3$ is 2 to 1. The compound when separated from the solution is a very soft tan solid which is soluble up to 10% in water and completely soluble in alcohol, hot and cold benzene and ethyl acetate. It is only slightly soluble in cold Stoddard solvent.

Other compounds which have been produced by the method of Example I and by other reactions are as follows:

Example II

Lauryl diethanolamine·BF₃ (1 to 1) is a clear brown heavy liquid which is soluble up to 10% in water, soluble in methyl alcohol, ethyl acetate and to some extent in hot benzene but insoluble in cold benzene and Stoddard solvent. It has fungicidal, bactericidal and larvicidal properties and is very useful because of its striking selectivity as an herbicide. It is also a surface tension depressant and it may be used as a mold catalyst.

Example III

Lauryl diethanolamine·BF₃ (3 to 1) is a very viscous liquid, soluble up to 10% in water, completely soluble in methyl alcohol, and soluble in ethyl acetate and hot and cold benzene and completely soluble in Stoddard solvent. It is useful as a fungicide, larvicide, bactericide and is important as a herbicide. It also is a good wetting agent.

Example IV

Myristyl diethanolamine·BF₃ (1 to 1) is a light yellow viscous liquid soluble up to 10% in water, soluble in methyl alcohol, ethyl acetate and almost completely soluble in benzene but insoluble in Stoddard solvent. It is a good fungicide, larvicide and bactericide and is useful as a herbicide. It is important as a wetting agent.

Example V

Myristyl diethanolamine·BF₃ (2 to 1) is a very soft yellowish solid soluble up to 5% in water, soluble in isopropyl alcohol, ethyl acetate and benzene and slightly soluble in Stoddard solvent. It is useful as a fungicide, larvicide, bactericide and herbicide, and is particularly useful as a wetting agent.

Example VI

Myristyl diethanolamine·BF₃ (3 to 1) is a soft brown solid soluble up to 5% in water. A 10% solution in water forms a jelly-like product when cold. It is soluble in ethyl alcohol, ethyl acetate and almost completely soluble in both benzene and Stoddard solvent. It has the properties of a fungicide, bactericide, larvicide, and herbicide. It has striking advantages as a wetting agent in that there is but little change in its properties with changes in concentration of from 0.01% to 1.0% in water solution—the surface tension in each instance being approximately 30 dynes per square centimeter at 23° C.

Example VII

Cetyl diethanolamine·BF₃ (1 to 1) is a yellowish solid melting at 54–56° C. although it softens at about 44° C. It is soluble up to 10% in water to form a very viscous solution and soluble in cold water at lower concentrations. It is also soluble in ethyl alcohol, ethyl acetate, benzene and Stoddard solvent, although it tends to disperse in the latter. It is an excellent fungicide, larvicide, bactericide and insecticide and has herbicidal properties. It is also a good wetting agent.

Example VIII

Cetyl diethanolamine·BF₃ (2 to 1) is a yellowish solid melting at 40–42° C. soluble up to 5% in water and otherwise generally similar in its properties to the 1 to 1 compound.

Example IX

Cetyl diethanolamine·BF₃ (3 to 1) is a brown, waxy solid soluble up to 1% in water and completely soluble in alcohol, ethyl acetate, benzene and Stoddard solvent. Its properties are otherwise similar to the 1 to 1 compound.

Example X

Stearyl diethanolamine·BF₃ (1 to 1) is a brown solid melting at 53–55° C. soluble to 1% or less in water, soluble in methyl alcohol, ethyl acetate and benzene and it is partially soluble but disperses in Stoddard solvent. It has pronounced fungicidal, bactericidal and insecticidal properties, is a good herbicide and a wetting agent.

Example XI

Stearyl diethanolamine·BF₃ (2 to 1) melts at 47–50° C. and softens at 40° C. It forms a viscous solution when dissolved up to 5% in water and is soluble in alcohol, ethyl acetate, benzene and hot Stoddard solvent. Its properties are much like those of the 1 to 1 complex.

Example XII

Stearyl diethanolamine·BF₃ (3 to 1) is a waxy solid and is soluble in water to the amount of only .10% to form a clear solution. Solutions containing 0.25% are turbid. It is completely soluble in alcohol, ethyl acetate, benzene and Stoddard solvent.

In addition to the compounds particularly referred to above a great number of additional compounds have been produced in accordance with the present invention. While the compounds containing an alkyl group having 10 to 18 carbon atoms in a straight chain are generally useful in combating bacteria and fungi, they are also effective as herbicides, wetting agents, insecticides, rodent repellants, moth repellants, as leveling agents in paints and as detergents for use in oils. It also should be understood that other uses of the compounds described may be found and other compounds of the class may have additional and different uses. In view thereof it is intended that the foregoing description of the invention and the uses of the compounds shall be indicative of the general nature of the new class of compounds and is not intended to limit the scope of the invention.

I claim:

1. A compound having the composition indicated by the formula

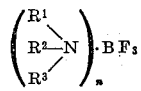

wherein R¹ is a monohydroxy alkyl radical containing at least two carbon atoms, R² is selected from the alkyl and alkenyl radicals having from 10 to 18 carbon atoms in a straight chain with a terminal carbon atom of the chain connected to the nitrogen atom of the amine, R³ is selected from the group consisting of hydrogen, monohydroxy alkyl radicals containing at least two carbon atoms and alkyl radicals, and $n$ is a whole number from 1 to 3.

2. A complex of boron trifluoride and an alkyldialkanol amine in which both alkanol groups are monohydroxy alkyl radicals containing at least two carbon atoms, and the alkyl group contains from 10 to 18 carbon atoms in a straight chain with a terminal carbon atom of the chain attached to the nitrogen atom of the amine, the amine and the boron trifluoride being combined in molar ratios of from 1 to 3 mols of the amine to 1 mol of boron trifluoride.

3. A complex of the class defined in claim 2 in which the ratio of the amine to BF₃ is 2 to 1.

4. A complex of the class defined in claim 2 in which the ratio of the amine to BF₃ is 3 to 1.

5. A complex of boron trifluoride and an alkyl diethanol amine containing an alkyl group having from 10 to 18 carbon atoms in a straight chain with a terminal carbon atom of the chain attached to the nitrogen atom of the amine, the amine and the boron trifluoride being combined in molar ratios of from 1 to 3 mols of the amine to 1 mol of boron trifluoride.

6. A complex of boron trifluoride and an alkyl diisopropanol amine in which the alkyl group contains from 10 to 18 carbon atoms in a straight chain with a terminal carbon atom of the chain attached to the nitrogen atom of the amine, the amine and boron trifluoride being combined in molar ratios of from 1 to 3 mols of the amine to 1 mol of boron trifluoride.

7. A complex of boron trifluoride and an amine containing a lauryl radical and at least one monohydroxy alkyl radical containing at least two carbon atoms wherein the amine and boron trifluoride are combined in molar ratios of from 1 to 3 mols of the amine to 1 mol of boron trifluoride.

8. A complex of boron trifluoride and an amine containing a myristyl radical and at least one monohydroxy alkyl radical containing at least two carbon atoms wherein the amine and boron trifluoride are combined in molar ratios of from 1 to 3 mols of the amine to 1 mol of boron trifluoride.

9. A complex of boron trifluoride and an amine containing a cetyl radical and at least one monohydroxy alkyl radical containing at least two carbon atoms wherein the amine and boron trifluoride are combined in molar ratios of from 1 to 3 mols of the amine to 1 mol of boron trifluoride.

10. A complex of boron trifluoride and an amine containing a stearyl radical and at least one monohydroxy alkyl radical containing at least two carbon atoms wherein the amine and boron trifluoride are combined in molar ratios of from 1 to 3 mols of the amine to 1 mol of boron trifluoride.

11. A complex of boron trifluoride and lauryl diethanol amine wherein the amine and boron trifluoride are combined in molar ratios of from 1 to 3 mols of the amine to 1 mol of boron trifluoride.

12. A complex of boron trifluoride and myristyl diethanol amine wherein the amine and boron trifluoride are combined in molar ratios of from 1 to 3 mols of the amine to 1 mol of boron trifluoride.

13. A complex of boron trifluoride and cetyl diethanol amine wherein the amine and boron trifluoride are combined in molar ratios of from 1 to 3 mols of the amine to 1 mol of boron trifluoride.

14. A complex of boron trifluoride and stearyl diethanol amine wherein the amine and boron trifluoride are combined in molar ratios of from 1 to 3 mols of the amine to 1 mol of boron trifluoride.

15. A complex of boron trifluoride and myristyl diisopropanol amine wherein the amine and boron trifluoride are combined in molar ratios of from 1 to 3 mols of the amine to 1 mol of boron trifluoride.

16. The method of producing a complex of an alkanol amine and boron trifluoride which comprises the steps of passing gaseous boron trifluoride into a solution of lauryl diethanolamine in isopropanol until from one-third to one mol of boron trifluoride has been combined and separating the resulting complex from the alcohol.

17. The method of producing a complex of an alkanol amine and boron trifluoride which comprises contacting gaseous boron trifluoride with lauryl diethanol amine.

18. The method of producing a complex of an alkanol amine and boron trifluoride which comprises contacting gaseous boron trifluoride with lauryl diethanol amine and continuing the process until from one-third to one mol of boron trifluoride has been combined with the lauryl diethanol amine.

No references cited.